J. W. LAUER.
WALKING BEAM.
APPLICATION FILED MAR. 3, 1910.
1,003,758.
Patented Sept. 19, 1911.
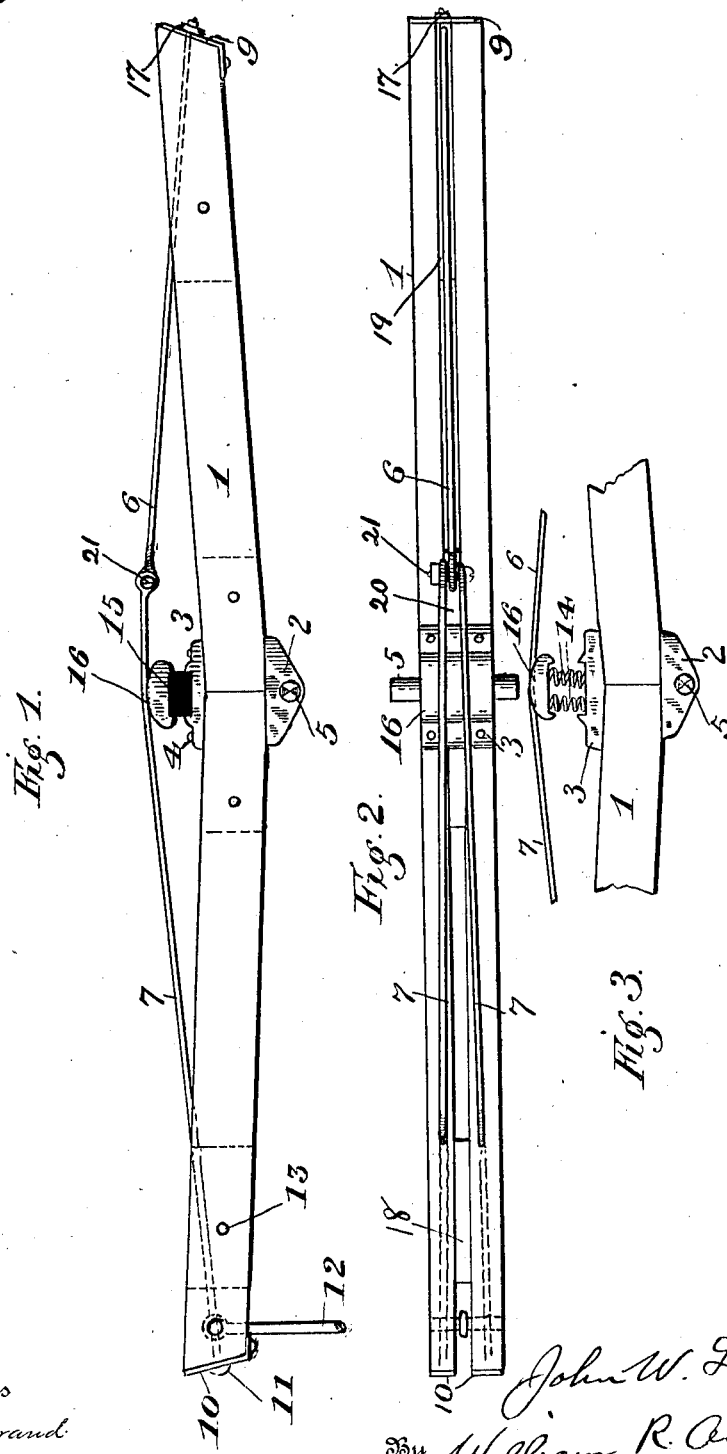
Witnesses
F. L. Ourand
Edwin L. Wilson
Inventor
John W. Lauer,
By William R. Andrews
Attorney

UNITED STATES PATENT OFFICE.

JOHN W. LAUER, OF BROOKVILLE, PENNSYLVANIA.

WALKING-BEAM.

1,003,758.  Specification of Letters Patent.  Patented Sept. 19, 1911.

Application filed March 3, 1910. Serial No. 547,140.

*To all whom it may concern:*

Be it known that I, JOHN W. LAUER, a citizen of the United States, residing at Brookville, in the county of Jefferson and State of Pennsylvania, have invented certain new and useful Improvements in Walking-Beams, of which the following is a specification.

My invention relates to walking-beams for use in drilling, and more especially in well drilling and the like; and the object thereof is to so construct the same that it will be resilient or yieldable, will have but few parts, the parts may be easily assembled and may be replaced when broken or worn, will be preferably made of metal and wood, and may be cheaply manufactured.

In the drawings forming a part of this specification, and in which like symbols of reference represent corresponding parts in the several views: Figure 1 is a longitudinal view of the device; Fig. 2 a plan view of the same; and Fig. 3 a sectional view, showing a modification of the spring of the same.

The walking-beam proper is composed, preferably, of four parts or sections indicated by 1, which are preferably of wood, the same having connecting blocks or spacing blocks 18, 19, and 20, the central block 20 being also a reinforcing piece for the four sections of the beam.

2 and 3 are plates at the top and bottom of the beam, the lower one carrying the trunnions 5, and the upper one receiving the rubber cushion 15 or springs 14, as desired.

13 are rivets connecting the sections and blocks of the walking-beam.

4 are screws connecting plates 2 and 3 with the walking-beam.

6 and 7 are rods connected by a rivet 21 and passing through the ends of the beam; 9 and 10 plates on the ends of the beam and receiving rods 6 and 7 through perforations in the same, the purpose of the plates being to protect the ends of the beam and reinforce the same; and 11 heads on ends of rods 7.

12 indicates the temper-screw stem; 16 a cap or guard for the top of the springs; and 17 a nut securing rod 6 to the beam. The rod 6 passes over the top of the block on its end of the beam; but the rods 7 pass through the side pieces of the beam on the other end.

The operation is apparent from the foregoing.

The walking-beam, as already explained, is made preferably of four sections, connected by the intervening blocks and the central piece 20 extending between the four sections firmly connecting them together. The rods 6 and 7 bracing these sections from the ends and having the intervening spring interposed between them, the walking-beam is made resilient or yieldable. It is made of metal and wood so that it is especially durable, and is, of course, easily repaired.

Having now fully described my invention, what I claim as new, and desire to secure by Letters-Patent, is:

1. A walking - beam, consisting of a plurality of elements, a cushion, means for holding said cushion on the top of said beam, and rods connecting the ends of the beam and passing over said cushion.

2. A walking-beam, consisting of four members, plates connecting the ends and center of said members, rods passing through one end of said beam, a second rod linked to the first-mentioned rods, means for securing the rod to the other end of the beam, plates at the ends of the beam, and a cushion located between the rods and beam, so that a yieldable or springy action is imparted to the same.

In testimony whereof I affix my signature in presence of two witnesses.

JOHN W. LAUER.

Witnesses:
WILLIAM L. MCCRACKEN,
C. S. IRVIN.

Copies of this patent may be obtained for five cents each, by addressing the "Commissioner of Patents, Washington, D. C."